May 15, 1951 C. H. HUFF 2,553,320
PUSHER ATTACHMENT FOR TRACTORS
Filed April 2, 1948 3 Sheets-Sheet 1

INVENTOR.
Clifford H. Huff.
BY
Thiess, Olson & Mecklenburger.
Attys.

May 15, 1951   C. H. HUFF   2,553,320
PUSHER ATTACHMENT FOR TRACTORS
Filed April 2, 1948   3 Sheets-Sheet 2

INVENTOR.
Clifford H. Huff
BY
Thiess, Olson & Mecklenburger
Attys.

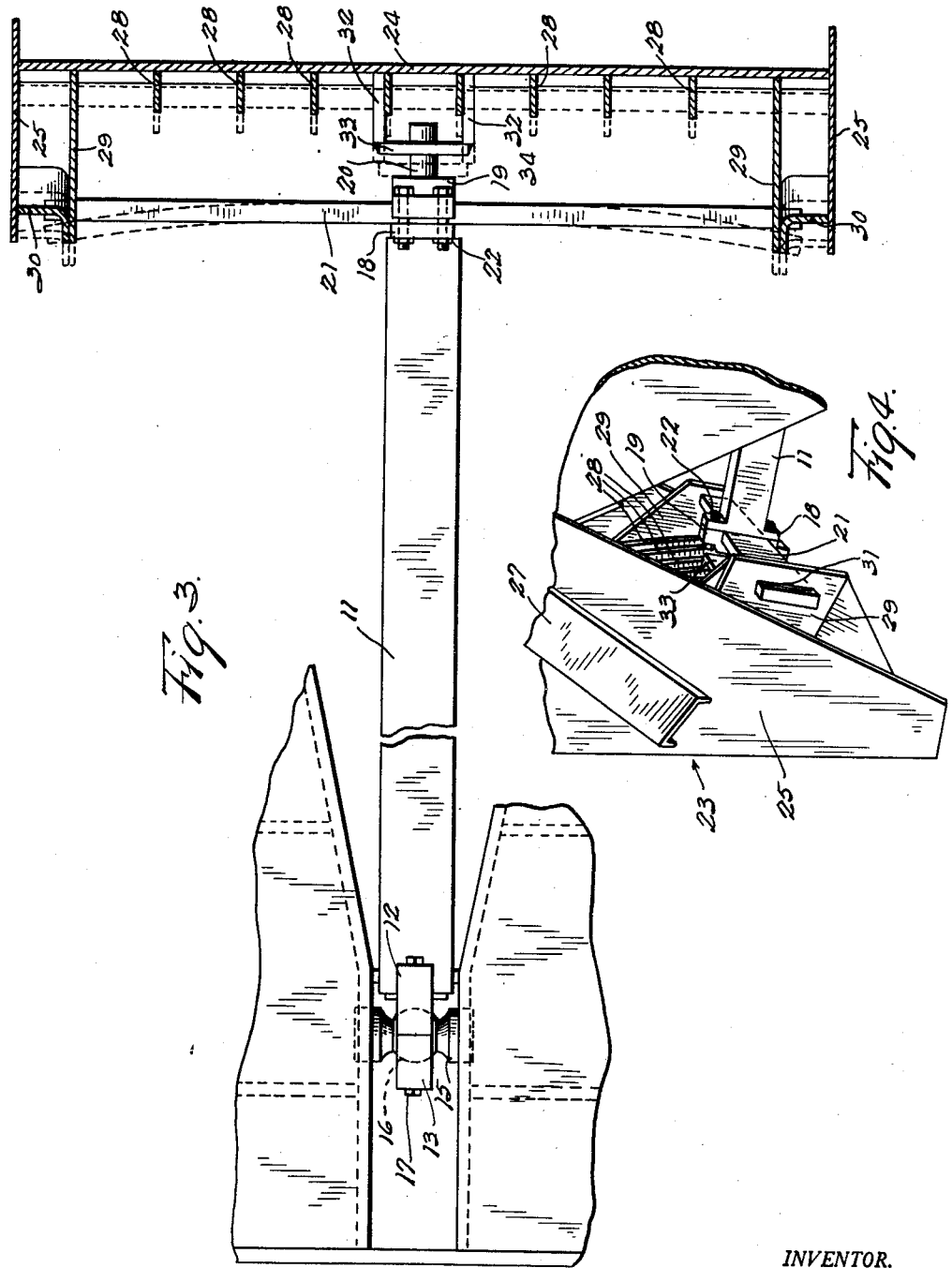

Patented May 15, 1951

2,553,320

UNITED STATES PATENT OFFICE 2,553,320

PUSHER ATTACHMENT FOR TRACTORS

Clifford H. Huff, Iowa City, Iowa, assignor to La Plant-Choate Manufacturing Co., Inc., Cedar Rapids, Iowa, a corporation of Delaware Application April 2, 1948, Serial No. 18,617

8 Claims. (Cl. 280—33.13)

This invention relates to pusher tractors, more particularly to pusher attachments for tractors employed to assist in the propulsion of earthmoving vehicles such as scrapers and the like during excavating or loading operations, and the invention has for an object the provision of improved pusher tractors and pusher attachments of this character.

In the operation of earthmovers or scrapers which are ordinarily drawn by a tractor or similar prime mover, it is common practice to employ a second tractor, such as a bulldozer, for example, for pushing the scraper during excavating or loading so as to add the tractive effort of the pusher tractor to the tractive effort provided by the draft tractor or prime mover, the scraper being provided at its rear end with a pusher block for engagement by a push plate such as a bulldozer blade. In making an excavation or cut, the scraper usually proceeds as far as possible under the tractive effort supplied by its draft tractor or prime mover, and the pusher tractor which is following up does not engage the pusher block to add its tractive effort until the draft tractor has substantially stalled. Accordingly, since the partially loaded scraper is at substantially a standstill when engaged by the forwardly moving pusher tractor, initial shock loads of considerable magnitude are imposed on the pusher elements, and it is a further object of this invention to provide a pusher attachment which is of rugged but simple construction, which is capable of resiliently absorbing the initial shock loads, and which may be readily installed on a tractor in place of conventional bulldozer attachments.

In carrying out the invention in one form, a pusher attachment is provided comprising a push frame mounted on and extending longitudinally of the tractor, together with a push plate extending transversely in front of the tractor and mounted for limited rearward movement toward the push frame, resilient means being provided between the push plate and push frame adapted to be stressed during said limited movement to absorb initial shock loads when initiating a pushing operation. More particularly, the push frame is pivotally supported on the tractor adjacent the rear end thereof and extends longitudinally beneath the tractor, while the push plate constitutes part of a U-shaped pusher member having rearwardly and upwardly extending legs pivotally connected to the tractor to provide for swinging movement of the push plate toward the push frame, and the resilient means comprises a laterally extending spring bar having a central portion connected to the push frame and the opposed ends thereof connected to the legs of the pusher member. The spring bar normally maintains the push plate in a position such that cooperating abutment means on the push plate and push frame are in spaced relation and the spring bar is adapted to be flexed upon initiation of a pushing movement to absorb initial shock loads, flexure of the spring bar being limited by the cooperating abutment means.

For a more complete understanding of the invention, reference should now be had to the drawing, in which:

Fig. 3 is a fragmentary sectional view, taken substantially along the line 3—3 of Fig. 2; and Fig. 4 is a fragmentary detail view in perspective illustrating certain structural details of the pusher attachment shown in Figs. 1 to 3.

Figure 1:
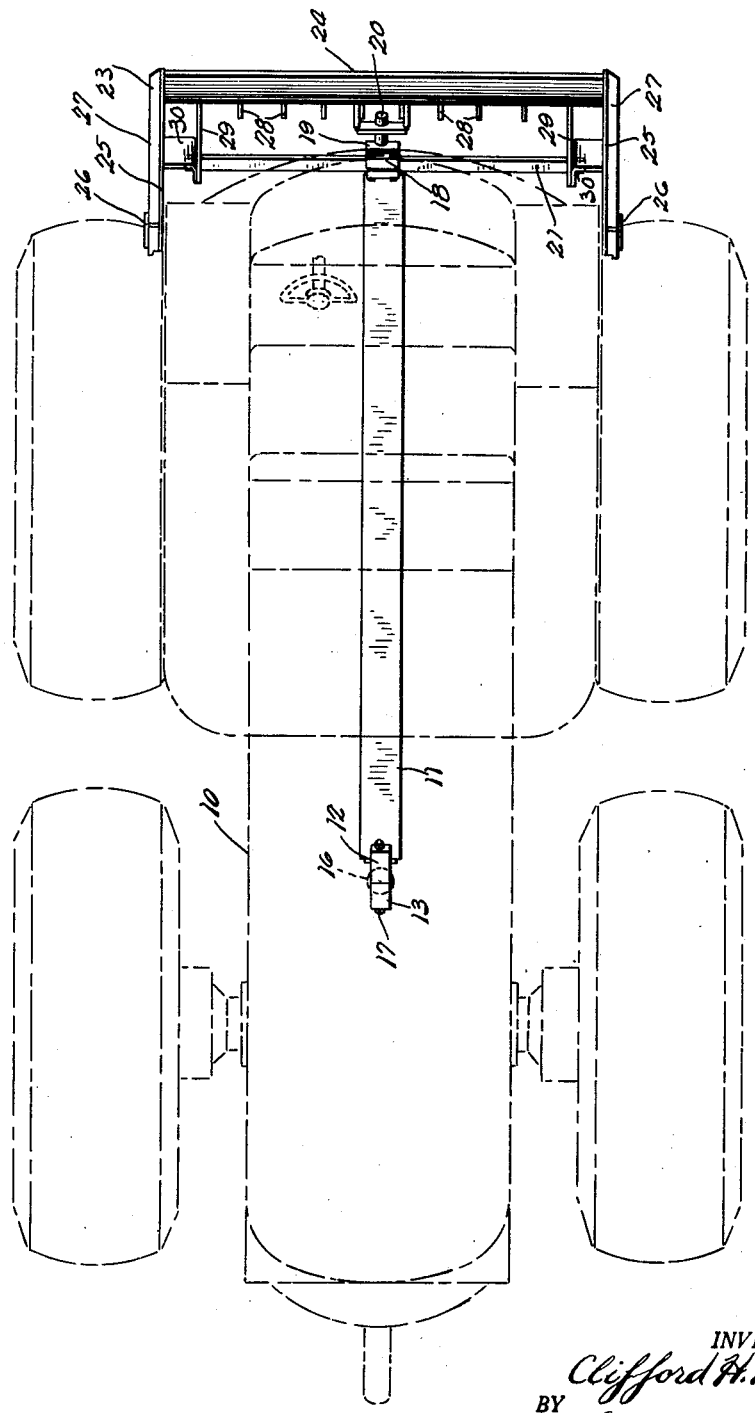
Fig. 1 is a plan view of a pusher attachment embodying the present invention mounted on a tractor which is shown in broken lines.

Referring now to the drawings, the invention is shown as embodied in a pusher attachment mounted on a tractor 10 which may be of conventional design and is shown in the drawings in broken lines. Although the tractor 10 is illustrated as a wheel-type tractor, it will of course be understood that pusher attachments embodying the invention may be applied to other types of tractors, such for example as track-laying tractors. Extending longitudinally of the tractor 10 beneath the main frame thereof is a push frame 11 which may be of any suitable construction, but which is shown as constituting a substantially rectangular structure, which is provided at its rearward end with a bearing receiving member 12 adapted to cooperate with a bearing cap 13 to provide a spherical socket for receiving a supporting bearing 15 which is mounted on the tractor frame, as shown best in Fig. 3, and which includes a spherical bearing portion 16. As shown, the bearing cap 13 is secured to the bearing receiving portion 12 by suitable bolts 17 to provide for ready disassembly of the push frame 11 from the tractor supported bearing 15 on which it is pivotally mounted.

Adjacent its forward end the push frame 11 is provided with a laterally extending flange or plate portion 18 adapted to carry a suitable abutment member 19, the forward face of which is provided with a forwardly extending stub shaft or guide 20, the purpose of which will be more fully described hereinafter. As shown, the abutment member 19 is provided in its rear face with a suitable notch for receiving the central portion of a transversely extending spring bar 21, and suitable bolts 22 are provided for securing the abutment member 19 to the plate or flange 18 so as securely to clamp the spring bar to the forward end of the push frame 11.

Pivotally mounted on the forward end of the tractor adjacent the forward end of the push frame 11 is a pusher member 23 which is substantially U-shaped and includes a laterally extending push plate 24 and a pair of rearwardly and upwardly extending legs 25. As shown best in Fig. 2, the legs 25 of the pusher member 23 are pivotally mounted adjacent their upper ends on suitable axes or shafts 26 which extend laterally on opposite sides of the tractor, and for strengthening purposes each of the legs 25 is provided with a channel member 27 which extends throughout substantially the length of the legs and provides the desired rigidity. Since the push plate 24 is subjected to severe loads during the pushing operation, it is preferably provided with a plurality of strengthening ribs 28 which extend vertically of the push plate 24 and are preferably welded to the rear face thereof.

Extending rearwardly from the push plate 24 adjacent opposite ends thereof and in substantially parallel relation to the legs 25 are suitable supporting plates 29, the rear ends of which are secured to suitable L-shaped braces 30 which are in turn secured to the legs 25, and each of the supporting plates 29 is provided adjacent its rear end with a suitable slot 31 (Fig. 4) for receiving the corresponding extending end of the spring bar 21. Mounted on the rear face of the push plate 24 and secured thereto by welding or otherwise is an abutment member which comprises a pair of rearwardly extending members 32 and a transversely extending abutment plate 33, the abutment plate 33 being provided, as shown best in Fig. 3, with an aperture 34 for loosely receiving the extending end of the stub shaft 20 to provide a lost motion connection between the pusher member 23 and the push frame 11 arranged to permit limited movement of the pusher member 23 relative to the push frame 11.

Figure 2:
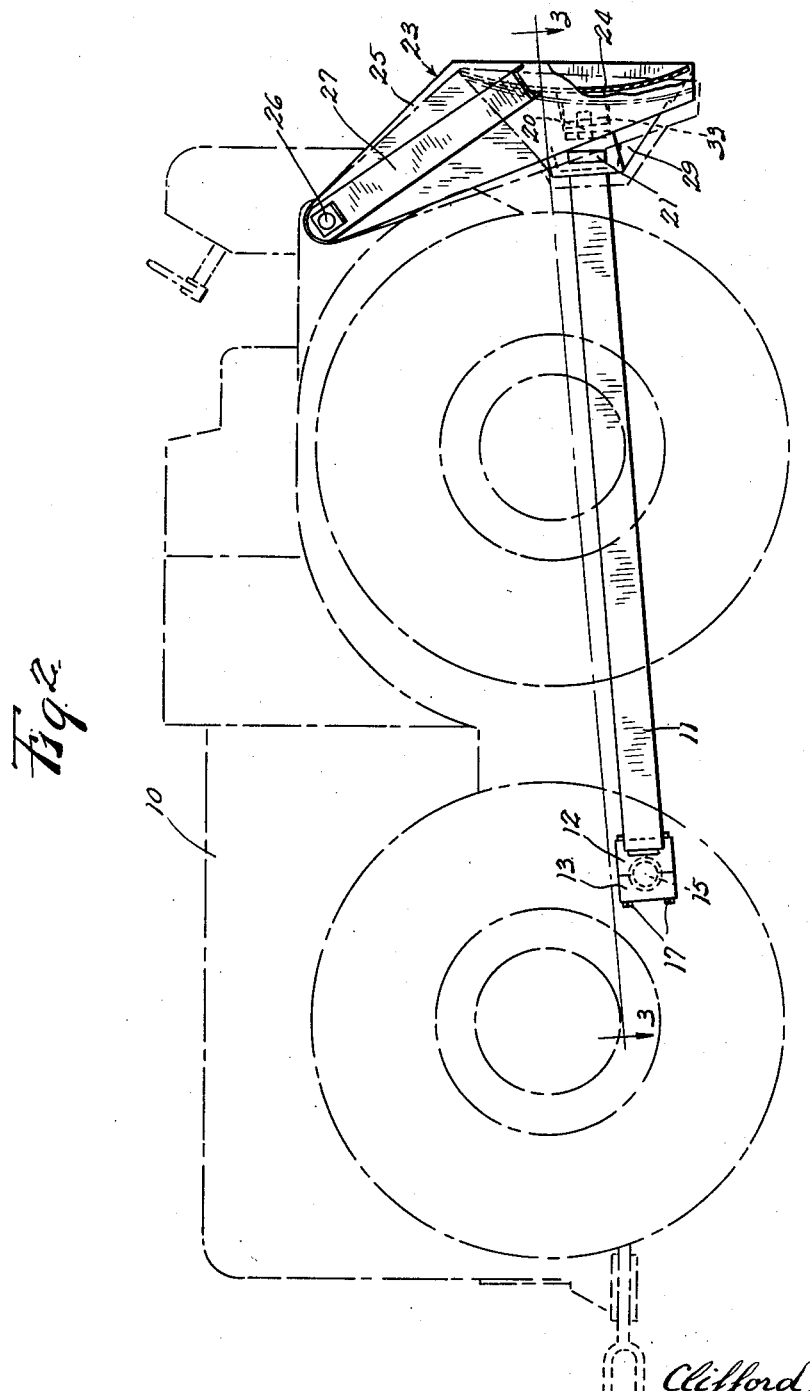
Fig. 2 is a side elevational view of the pusher attachment and tractor shown in Fig. 1.

In Figs. 2 and 3 the relative positions of the various parts when the pusher member is not effecting a pushing operation are shown in heavy lines, and it will be observed that the spring bar 21 in its normal straight position maintains the pusher member 23 and the push plate 24 in forwardly spaced relation so that the abutment member 19 on the push frame 11 and the abutment plate 33 on the push plate 24 are out of engagement. Upon initiation of the pushing operation, however, by engaging the push plate 24 with a pusher block of the vehicle or scraper to be pushed, the push plate 24 is caused to move rearwardly with respect to the push frame 11 and deflect the spring bar 21 to the broken-line position shown in Figs. 2 and 3, thereby stressing the spring bar so as to absorb initial shock loads.

The extent to which the spring bar 21 may be deflected upon initiation of a pushing operation is limited by the abutment members 19 and 33, engagement of these elements, as shown in broken lines in Figs. 2 and 3, imposing all of the pushing load directly upon the push frame 11. At the end of the pushing operation, when the vehicle or scraper is moved away from the pusher tractor under its own tractive effort, the spring bar 21 is immediately effective to return the push plate 24 and the abutment members to the normal full-line position shown in Figs. 2 and 3, the pusher member 23 swinging about the pivots 26, and the lost motion connection provided by the aperture 34 and the stub shaft 20 serving to maintain the push frame 11 and the pusher member 23 in proper relative positions.

It will now be seen that a pusher attachment for a tractor has been provided which is of simple and rugged construction, which may be readily mounted upon and disassembled from a standard tractor, and which effectively absorbs initial shock loads encountered upon initiation of a pushing operation. Although the invention is not limited thereto, it has been shown as applied to a type of tractor adapted for use with a bulldozer attachment, the bearing member 15 being utilized to support the rear end of a suitable bulldozer push frame, and the stub shafts 26 being arranged to carry the hydraulic jacks for operating the bulldozer blade which is carried at the forward end of the bulldozer push frame. A bulldozer or earthmover of this construction is described and claimed in a copending application Serial No. 12,740, filed March 3, 1948, in the name of Harvey W. Rockwell, which application is assigned to the same assignee as the present invention.

While a particular embodiment of the invention has been shown, it will be understood, of course, that the invention is not limited thereto since many modifications may be made, and it is therefore contemplated by the appended claims to cover any such modifications as fall within the true spirit and scope of the invention.

Having thus described the invention, what is claimed and desired to be secured by Letters Patent is:

1. A pusher attachment for a tractor having a main frame comprising a push frame extending longitudinally and generally centrally of said tractor beneath the main frame and pivotally mounted thereon, a push plate extending transversely in front of said tractor, means mounting said push plate on said push frame for limited rearward movement with respect thereto when initiating a pushing operation, and a laterally extending spring bar engaging said push frame and said push plate at opposite sides of said push frame and adapted to be flexed during said limited movement to absorb initial shock loads.

2. A pusher attachment for a tractor comprising a push frame mounted on and extending longitudinally of said tractor, a push plate extending transversely in front of said tractor, means mounting said push plate on said push frame for limited rearward movement with respect thereto when initiating a pushing operation, a laterally extending spring bar, means connecting a central portion of said spring bar to said push frame, and means for connecting the opposed end portions of said spring bar to said push plate, whereby said limited movement flexes said spring bar to absorb initial shock loads.

3. A pusher attachment for a tractor comprising a push frame mounted on and extending forwardly of said tractor, a push plate extending transversely in front of said tractor and push frame, means pivotally mounting said push plate on said tractor for swinging movement toward and away from said push frame, a laterally extending spring bar having opposed end portions thereof connected to said push frame, means connecting a central portion of said spring bar to said push frame, said spring bar normally maintaining said push plate in forwardly spaced relation to said push frame, whereby initial movement of said push plate toward said push frame when initiating a pushing operation flexes said spring bar to absorb shock loads, and abutment means on said push plate and push frame for limiting said initial movement.

4. A pusher attachment for a tractor comprising a push frame mounted on and extending forwardly of said tractor, a U-shaped pusher member having a transversely extending push plate disposed forwardly of said push frame and having rearwardly and upwardly extending legs at opposite ends of said push plate, means pivotally connecting said legs to opposite sides of said tractor to provide for swinging movement of said push plate toward said push frame, cooperating abutment means on said push frame and said push plate, a spring bar connecting said push frame and said pusher member for normally maintaining said cooperating abutment means in spaced relation and for resisting movement of said pusher member in a direction to engage said abutment means thereby to absorb initial shock loads upon initiation of a pushing operation.

5. A pusher attachment for a tractor comprising a push frame mounted on and extending forwardly of said tractor, a U-shaped pusher member having a transversely extending push plate disposed forwardly of said push frame and having rearwardly and upwardly extending legs at opposite ends of said push plate, means pivotally connecting said legs to opposite sides of said tractor to provide for swinging movement of said push plate toward said push frame, cooperating abutment means on said push frame and said push plate, and a spring bar having a central portion thereof connected to said push frame and the opposed ends thereof respectively connected to said legs of said pusher member, said spring bar normally maintaining said pusher member in a forward position wherein said cooperating abutment means are out of engagement, said spring bar being flexed upon initiation of a pushing movement thereby to absorb initial shock loads.

6. A pusher attachment for a tractor having a main frame, comprising a push frame extending longitudinally of said tractor beneath the main frame thereof, means depending from said main frame for pivotally supporting said push frame at the rear end thereof, a U-shaped pusher member having a transversely extending push plate disposed forwardly of said push frame and having rearwardly and upwardly extending legs at opposite ends of said push plate, means pivotally connecting said legs to said tractor to provide for swinging movement of said push plate toward said push frame, cooperating abutment members disposed on said push frame and said push plate respectively, one of said abutment members including an aperture therein and the other of said abutment members including a guide pin slidable in said aperture during said swinging movement, and resilient means resisting movement of said push plate toward said push frame and normally maintaining said abutment members out of engagement with each other thereby to absorb initial shock loads upon initiation of a pushing operation.

7. A pusher attachment for a tractor having a main frame, comprising a push frame extending longitudinally of said tractor beneath the main frame thereof, means depending from said main frame for pivotally supporting said push frame at the rear end thereof, a U-shaped pusher member having a transversely extending push plate disposed forwardly of said push frame and having rearwardly and upwardly extending legs at opposite ends of said push plate, means pivotally connecting said legs to said tractor to provide for swinging movement of said push plate toward said push frame, cooperating abutment members disposed on said push frame and said push plate respectively, one of said abutment members including an aperture therein and the other of said abutment members including a guide pin slidable in said aperture during said swinging movement, and a laterally extending spring bar engaging said push frame and said push plate and adapted to be flexed during movement of said push plate toward said frame, said cooperating abutment members limiting the flexure of said spring bar.

8. A pusher attachment for a tractor having a main frame, comprising a push frame extending longitudinally of said tractor beneath the main frame thereof, means depending from said main frame for pivotally supporting said push frame at the rear end thereof, a U-shaped pusher member having a transversely extending push plate disposed forwardly of said push frame and having rearwardly and upwardly extending legs at opposite ends of said push plate, means pivotally connecting said legs to said tractor to provide for swinging movement of said push plate toward said push frame, cooperating abutment members disposed on said push frame and said push plate respectively, one of said abutment members including an aperture therein and the other of said abutment members including a guide pin slidable in said aperture during said swinging movement, and a spring bar having a central portion thereof connected to said push frame and the opposed ends thereof respectively connected to said legs of said pusher member, said spring bar normally maintaining said pusher member in a forward position wherein said cooperating abutment means are out of engagement, said spring bar being flexed upon initiation of a pushing movement thereby to absorb initial shock loads.

CLIFFORD H. HUFF.

REFERENCES CITED

The following references are of record in the file of this patent:

UNITED STATES PATENTS

| Number | Name | Date |
|---|---|---|
| 1,347,448 | Evans | July 20, 1920 |
| 1,653,118 | Pellett | Dec. 20, 1927 |
| 1,745,733 | Bedford | Feb. 4, 1930 |
| 1,977,817 | Bird | Oct. 23, 1934 |
| 2,075,482 | Thorpe | Mar. 30, 1937 |
| 2,247,664 | Osman | July 1, 1941 |

FOREIGN PATENTS

| Number | Country | Date |
|---|---|---|
| 252,914 | Great Britain | June 10, 1926 |